Figure 1:
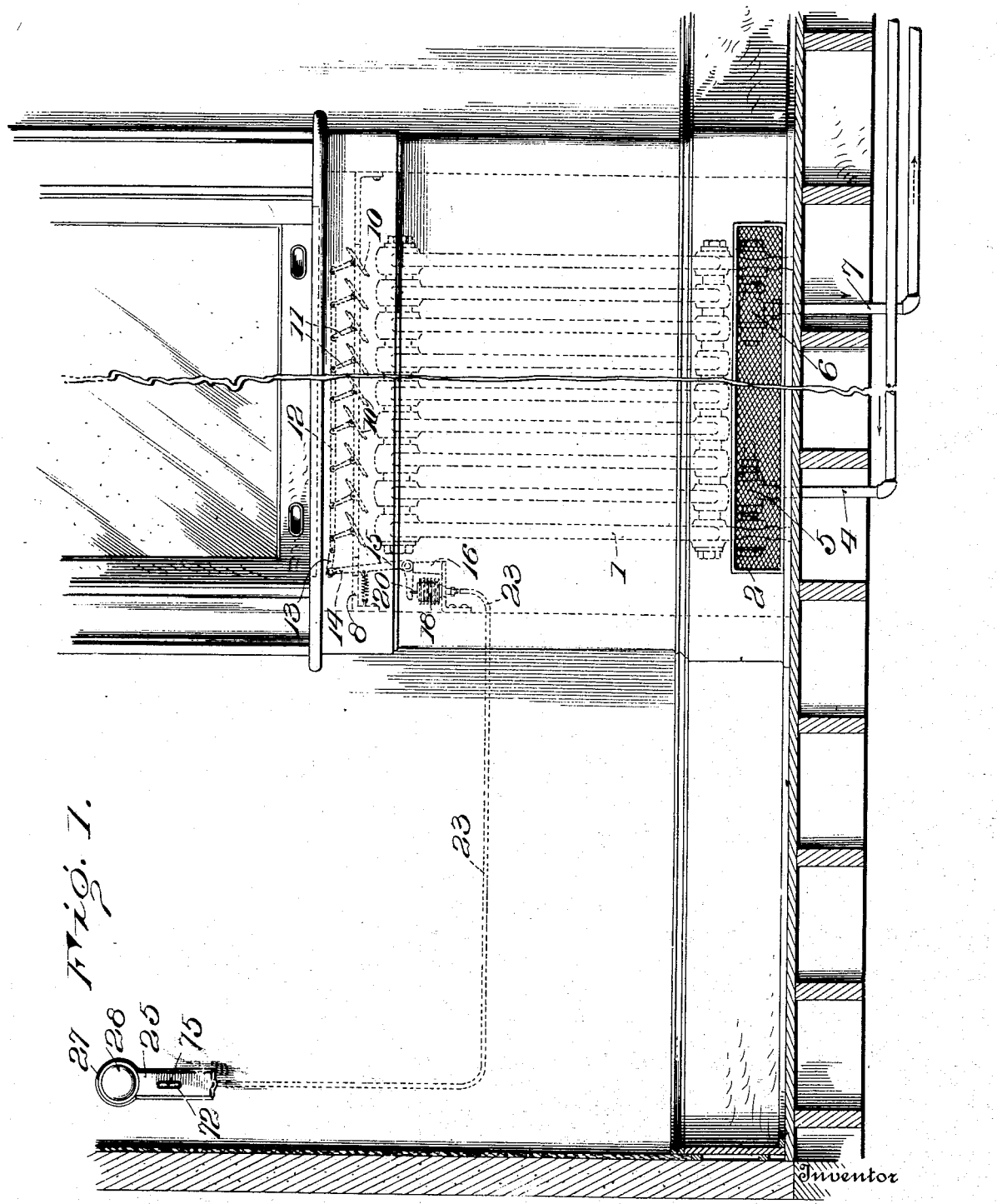

W. M. FULTON.
SYSTEM OF TEMPERATURE REGULATION.
APPLICATION FILED APR. 12, 1915.

1,186,180.

Patented June 6, 1916.
3 SHEETS—SHEET 1.

W. M. FULTON.
SYSTEM OF TEMPERATURE REGULATION.
APPLICATION FILED APR. 12, 1915.

1,186,180.

Patented June 6, 1916.
3 SHEETS—SHEET 2.

Fig. 2.
Fig. 3.

Inventor
Weston M. Fulton
By
Mauro, Cameron, Lewis & Massie
Attorneys

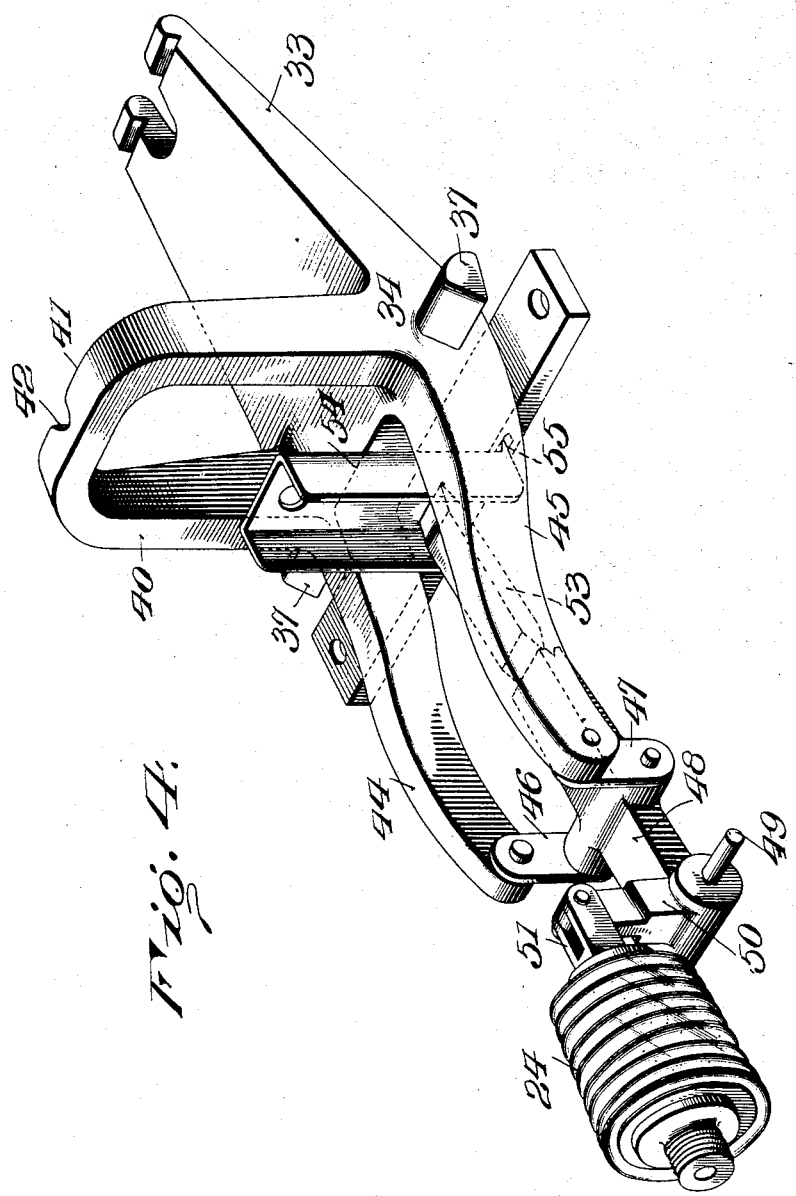

UNITED STATES PATENT OFFICE.

WESTON M. FULTON, OF KNOXVILLE, TENNESSEE ASSIGNOR TO THE FULTON COMPANY, OF KNOXVILLE, TENNESSEE, A CORPORATION OF MAINE.

SYSTEM OF TEMPERATURE REGULATION.

1,186,180. Specification of Letters Patent. Patented June 6, 1916.

Application filed April 12, 1915. Serial No. 20,757.

*To all whom it may concern:*

Be it known that I, WESTON M. FULTON, (whose post-office address is care of the Fulton Company, White avenue and Second street, Knoxville, Tennessee) have invented a new and useful Improvement in Systems of Temperature Regulation, which invention is fully set forth in the following specification.

This invention relates to systems of temperature regulation and more particularly to systems of this class in which a room thermostat is used to control the flow of heated air through an incased radiator which heats the air in the room.

The invention has for its object to secure closer regulation of the room temperature where inclosed radiators are used for heating, and to simplify the manner of transmitting power from the thermostat in the room to the casing dampers, and to obviate the use of cumbersome and unsightly connections heretofore employed.

A further object of the invention is to enable the thermostat to be placed at any distant position in the room to be heated without reducing the efficiency of the power transmission for operating the dampers; and further to provide a self-powered thermostatic device which will operate when a predetermined temperature is reached without requiring but a slight increase of this temperature to quickly carry the stroke of the vessel and its connected parts to their limit.

The above and other objects will be explained in the detailed description.

With the above objects in view, my invention consists in providing a hydraulic power transmitting device comprising two collapsible and expansible vessels connected by a conduit preferably concealed in the walls of the building and filled with oil or other liquid. One of these vessels is connected with the dampers in the radiator casing, and the other with the thermostat which is exposed to the air heated by the radiator.

The invention further resides in providing in connection with a thermosensitive collapsible and expansible vessel, a yielding means adapted to delay the operation of the vessel due to rise of room temperature, until a predetermined room temperature and pressure in the vessel is reached and thereafter to assist the action of the thermostat to quickly carry the stroke of the vessel and its connected parts through a full stroke, said means also compensating for the resiliency of the walls of the thermostatic vessel and its associated yielding elements.

In order that the invention may be more readily understood, reference is had to the accompanying drawings which show, by way of example, one mechanical embodiment of the inventive idea, but such drawings are for the purpose of assisting the description and are not for the purpose of defining the limits of the invention.

Figure 1 is a view partly in elevation and partly in section, showing my improvements installed in a room; Fig. 2 is an enlarged detail view showing the arrangement of the dampers and that part of their operating means under the radiator casing; Fig. 3 is a view of the thermostatic device with its side wall broken away to show the interior structure; and Fig. 4 is a perspective detail view of the lever means connecting the thermostatic vessel and the hydraulic power transmission.

Referring to Fig. 1 of the drawings, 1 is a sectional incased radiator here shown as set into a recess in the wall of the building underneath a window-sill. Air enters at the base through a grille opening 2 and escapes through a grille 3 at the level of the window-sill shown in section in Fig. 2. Heating fluid, such as steam, is admitted to the radiator through a supply pipe 4 and globe valve 5 while water of condensation is discharged past a thermostatic valve 6 into return pipe 7, steam being held back by the valve. Below the grille 3 and above the radiator 1 is a damper supporting frame 8 which is secured to the sides of the radiator recess in the room wall by brackets 9 or other means. A plurality of dampers 10 are hinged to frame 8, and are provided with arms 11 pivoted to an operating rod 12 connected by a link 13 to one arm 14 of a bell-crank lever 15 pivotally supported on arms 16, only one of which appears extending upward from bracket 17. A collapsible and expansible vessel 18 is secured to bracket 17 by means of a threaded hub 19 engaging a threaded opening in the bracket. The inflexible movable end wall of vessel 18 carries a knife-edge 20 which rests in a groove formed on the underside of lever arm 21. A spring 22 secured to arm 14 and to the bracket 17 holds lever arm 21 yieldingly against knife-edge 20.

The collapsible and expansible vessel 18 is connected through a conduit 23, preferably concealed in the wall of the room, with a similar vessel 24 which constitutes a part of a thermostatic device 25 located at a distance from the radiator in a suitable part of the room. The two vessels 18 and 24 and the connecting conduit are filled with liquid, such as oil or water, and constitute a hydraulic power transmission which receives power from the movements of a thermosensitive element and transmits it to the distant damper operating members in the radiator casing.

Referring to Fig. 3, 26 is a thermosensitive collapsible and expansible vessel held in place by a spider frame 27 which fits over the convex top closure 28 of the vessel, and is secured to a base 29. Extending from the top closure 28 is a perforated tubular stop member 30 which limits the extent of collapse of the corrugations. 31 is an inflexible bottom end closure to which is made fast a wedge-shaped piece 32 which is adapted to bear in depressions on the end of an arm 33 of a power transmitting lever 34.

Referring to Fig. 4, the end of arm 33 is shown forked for the purpose of giving a clearance space for charging tube 35 opening into vessel 26. A plug 36 closes the end of this tube. Lever 34 is provided with knife-edge trunnions 37 which bear on a recessed fulcrum member 38 secured to a bridge piece 39 made fast to the base 29. Lever 34 is also provided with a pair of upright arms 40 united by a cross-piece 41 having a centrally located groove 42 for receiving a main tension spring 43, and with two horizontally extending arms 44, 45 to which is connected by means of links 46, 47 an arm 48 of a bell-crank lever pivoted at 49, the other arm 50 of which is pivotally connected to a forked extension 51 of the head 52 of vessel 24.

Bell-crank lever arm 48 also constitutes the pivoted element of a toggle joint in which 53 is the resistance element bearing at one end in a groove in the end of an arm 48, and at the opposite end in a groove formed in a rocker member 54. Rocker 54 is provided on one side and at its lower extremity with a knife-edge projection 55 bearing in a groove in bridge member 39. The upper extremity of rocker 54 is adapted to receive the hooked end of a spring 56, the opposite end of the spring being secured to a threaded nut 69 which receives an adjusting screw 70 passing through a standard 71 fast to the base 29.

Means are provided for setting the thermostat to operate at a predetermined temperature, and to this end a sight opening is provided in the front wall of the thermostat casing and preferably closed by a transparent plate 72. At the rear of this plate is supported a dial card 73 bearing a temperature scale held in any suitable manner, such as by a card slip 74 struck up from sheet metal and secured to the casing and standard 71. An index finger 75 is arranged to move along the side of the scale and is supported on a nut 76 fast to the end of spring 43. Nut 76 receives a threaded rod 77 preferably having a shouldered stem for receiving a key which may be introduced through an opening 78 in the casing wall.

Vessel 24 is supported on a standard 79 and is connected to conduit 23 by means of a suitable coupling joint 80.

The operation of the system is as follows: Assume that the elements of the thermostatic device have been assembled as shown, and that vessels 18 and 24 together with connecting tube 23 have been filled with a suitable power transmitting fluid such as oil, alcohol, or brine, and the said fluid has been hermetically sealed therein. Assume that vessel 26 is open to the air and has been collapsed under spring pressure, due to the combined action of spring 43 and to spring 68 acting through resisting member 53 on the depressed arm 48 of the toggle device. Vessel 24 will thereby be expanded in length and atmospheric pressure acting upon the outside of vessel 18 will collapse the same by a corresponding amount, thus forcing some of the power transmitting fluid out of vessel 18 into vessel 24 and causing spring 22 to force arm 14 of bell crank lever 15 to the left as seen in Fig. 2, thereby opening the dampers of the radiator casing to permit the radiator to give out heat to the room to be heated. The charging tube 35 is connected with a source of compressed air and a pressure gage. While the vessel is held in collapsed position under the action of springs 43 and 68, it is charged to a predetermined pressure through charging tube 35 and the source of compressed air, noting the pressure on the pressure gage. The tension of spring 68 is adjusted by means of screw 70 until a slight increase of air pressure starts the outward movement of wall 2 of the vessel, thereby producing a force against vessel 24, tending to collapse the same and expand vessel 18. This movement will continue to the end of the stroke by reason of the decreasing toggle resistance as explained below. The device now has been adjusted to compensate for resiliency of vessels 18, 24, 26 and upper or main spring 43. This adjustment is made at the factory and requires no change during the life of the device. It will thus be apparent that my device is greatly simplified by employing a single compensating means to compensate for the resiliency of vessels 18, 24 and 26 and spring 43.

A charge of volatile liquid is next introduced and sealed in the vessel while immersed in a bath of proper temperature previously determined by careful tests. The quantity of volatile liquid suitable for a charge in a given vessel depends on the nature of the volatile liquid selected and size of the vessel, and should be sufficient to develop in the vessel, at the temperature for operating it, a pressure substantially equal to that of the air pressure previously used to start the expansion of the vessel. The charge having been introduced into the vessel 26, the index finger 75 is moved along the scale to the point at which the room temperature is to be maintained. This is effected by turning screw 17 by means of a key inserted through opening 78.

The thermostat, when it leaves the factory, is ready to be coupled to the conduit of the hydraulic power transmitting device which has previously been installed in the building. Now, assume that the room temperature is to be maintained at 75° F. The index finger is moved in the manner described to the 75 mark on the scale. Assume also that the room temperature has fallen below 75° F. The vessel will be in its collapsed position and the toggle members 48 and 53 will be at the bottom of their stroke. Vessel 24 will be expanded, vessel 18 collapsed and the dampers 10 in the casing will be open to permit of air circulation past the radiator sections and into the room. As the room temperature rises, vapor pressure in the thermostatic vessel increases but no expansion of the vessel occurs, till a temperature of 75° F. is reached. At this point a slight increase of pressure is sufficient to start the upward stroke of the toggle members 48 and 53. Owing to the law of operation of the toggle joint, the advantage of the power applied to the pivoted toggle element 48 through link 47, arms 45 and 33 rapidly gains over the resistance of spring 68, as the middle of the stroke of the toggle elements 48 and 53 is approached or as these elements approach alinement. In other words, spring 68 offers a decreasing resistance to the extension of the vessel. This rate of decrease up to the alinement of the toggle elements 48 and 53 is greater than the increase of tension of main spring 43. The upward stroke of the toggle elements or the extension of the vessel once begun continues. In the position shown in Fig. 3, spring 68 offers no resistance to this movement, and when the toggle elements pass this zero position, the spring 68 coöperates with the thermostat 26 to overcome the tension of spring 43. The stroke of the vessel 26 therefore does not begin till the predetermined temperature of 75° is reached, and then continues to the end with a very slight excess of pressure necessary to effect its movement.

During this extension of the vessel, power has been applied to the end wall of vessel 24 to collapse its walls and to expel its contents through conduit 23 into distant vessel 18 which now expands. Bell-crank lever 15 is tilted to the right to close the dampers 10. Whenever the room temperature falls below 75° F. a reverse operation of the device takes place to open the dampers.

It is to be noted that spring 68 acting through the toggle elements also applies a compensating force to the corrugations of vessel 26, vessels 24, 18 and spring 43. When the corrugations are collapsed below their normal position and introduce resistance to compression, the spring 68 assists in compressing the vessel; and when the corrugations expand beyond this normal position and offer resistance to extension of the walls, spring 68 applies a force to compensate this resistance.

What is claimed is:

1. In combination, a power transmitting conduit having resilient end closures, a thermosensitive collapsible and expansible vessel subject to variations of temperature, a lever system connecting said vessel with one end closure, resilient means acting to contract said vessel, and yielding means acting through said lever system to restrain extension of said vessel until a predetermined temperature is reached and above that temperature acting through said lever system to extend said vessel through a quick stroke.

2. In combination, a power transmitting conduit having resilient end closures, a thermosensitive collapsible and expansible vessel subject to variation of temperature, a lever system connecting said vessel with one end closure, adjustable resilient means acting to collapse said vessel and provided with a temperature index for setting the thermostat to operate at a predetermined temperature, and yielding means acting through said lever system to restrain extension of said vessel until a predetermined temperature is reached and above that temperature acting through said lever system to extend said vessel through a quick stroke.

3. In combination, a power transmitting conduit having resilient end closures, a thermostatic collapsible and expansible vessel subject to variation of temperature, a lever system connecting said vessel with one end closure, resilient means acting to contract said vessel, an adjustable spring having toggle joint connections with said lever system and acting in one position of the lever system to assist said resilient means to hold said vessel from extending until a predetermined temperature is attained and in another position of the lever system to assist the extension of said vessel through its stroke.

4. In combination, a power transmitting conduit having resilient end closures, a thermosensitive collapsible and expansible vessel subject to variation of temperature, a lever system connecting said vessel and one of said closures and adapted to multiply the power transmitted from the vessel to the closure, a spring acting to contract said vessel, and a second spring having toggle lever connections with said lever system adapted to coöperate with the first-named spring to collapse said vessel for temperatures below a predetermined point and above said point to assist the extension of the vessel through its full stroke.

5. In combination, a power transmitting conduit having resilient end closures, a thermosensitive collapsible and expansible vessel subject to variation of temperature, a lever system connecting said vessel with one end closure, resilient means acting through said lever system to contract said vessel, and a spring-pressed toggle joint connected to said lever system and adapted in one position of said joint to act with said spring means to hold said vessel from expanding until a predetermined temperature is attained therein and in another position to assist the extension of the vessel through its full stroke.

6. In combination, a power transmitting conduit having resilient end closures, a collapsible and expansible thermosensitive vessel, a compound lever having a long arm connected to said vessel and a short arm connected to one of said closures, a spring having a connection with one member of said compound lever acting thereon to collapse said vessel, and a second spring having a toggle joint connection with another member of said compound lever and adapted to coöperate in collapsing the vessel for temperatures below a predetermined point and to overcome working resistance when said temperature is passed.

7. In combination, a power-transmitting conduit having collapsible and extensible end closures, a spring-pressed thermosensitive collapsible and expansible vessel, a pair of connected levers connecting the movable end wall of said vessel and one end closure, and yielding means acting through said levers to restrain extension of said vessel until a predetermined temperature is reached and above that temperature acting to extend said vessel through its full stroke.

In testimony whereof I have signed this specification in the presence of two subscribing witnesses.

WESTON M. FULTON.

Witnesses:
P. J. HOLBROOK,
H. S. McCOY.